United States Patent [19]

Suzuki

[11] 4,074,286
[45] Feb. 14, 1978

[54] AUTOMATIC EXPOSURE CONTROL DEVICE FOR A CAMERA INCLUDING AUTOMATIC FILM SPEED SETTING MEANS

[75] Inventor: Ryotaro Suzuki, Omiya, Japan
[73] Assignee: Fuji Photo Optical Co., Ltd., Omiya, Japan
[21] Appl. No.: 736,588
[22] Filed: Oct. 28, 1976
[30] Foreign Application Priority Data
  Oct. 28, 1975 Japan ............... 50-129515
  Oct. 28, 1975 Japan ............... 50-129516
  Sept. 7, 1976 Japan ............... 50-107004
[51] Int. Cl.² ............................... G03B 7/00
[52] U.S. Cl. ..................... 354/21; 354/37; 354/59
[58] Field of Search ........ 354/21, 28, 37, 41, 354/48, 58, 42, 49, 59

[56] References Cited
U.S. PATENT DOCUMENTS

| | | | |
|---|---|---|---|
| 3,636,847 | 1/1972 | Akasaka | 354/21 |
| 3,667,363 | 6/1972 | Tanaka | 354/21 |
| 3,852,777 | 12/1974 | Lieser | 354/21 X |
| 4,000,497 | 12/1976 | Galbraith, Jr. | 354/59 X |

*Primary Examiner*—L. T. Hix
*Assistant Examiner*—M. L. Gellner
*Attorney, Agent, or Firm*—Harold L. Stults; Pasquale A. Razzano

[57] ABSTRACT

An automatic exposure control device built in a camera body provided with a flash-matic means for controlling the diaphragm aperture when taking pictures with flash light as well as an exposure control circuit for controlling the shutter speed or the diaphragm aperture in accordance with the scene brightness measured with a photodetector includes an automatic film speed setting means. The film speed setting means is comprised of a film speed sensing contact pair which senses a particular conductor attached to the surface of a film magazine containing a film of particularly high film speed, an electromagnet connected in series with the sensing contact pair, and a mechanism controlled by the electromagnet to selectively take one of two positions. In one position, a light control member is put into a position to bring an aperture for the normal film speed into alignment with the photodetector of the exposure control circuit and to bring a cam for the normal film speed into alignment with a film speed input lever of a flash-matic means. In the other position, an aperture and a cam for a special film speed are brought into alignment with the photodetector and the film speed input lever.

24 Claims, 9 Drawing Figures

AUTOMATIC EXPOSURE CONTROL DEVICE FOR A CAMERA INCLUDING AUTOMATIC FILM SPEED SETTING MEANS

BACKGROUND OF THE INVENTION

1. Field of the Invention

This invention relates to an automatic exposure control device for a photographic camera wherein a setting to reflect the film speed of the film loaded in the camera is automatically made, and more particularly to a device for automatically controlling exposure in a photographic camera provided with a flash-matic means (explained hereinbelow) wherein a setting to reflect the film speed of the film loaded in the camera is automatically made in an exposure control means associated with the flash-matic means. More specifically, the exposure control device for a camera in accordance with the present invention automatically controls exposure with respect to two kinds of film speed, i.e. normal film speed and one special film speed, generally a high speed.

The flash-matic means mentioned above is an exposure control means for flash-light photographing provided in a camera including calculating means which takes into consideration the distance to the object to be photographed and illuminated by the flash light, the film speed of the film loaded in the camera and the guide number of the flash light.

2. Description of the Prior Art

It has been known in the art to take film speed into consideration in automatically controlling exposure in a photographic camera. In those cameras in which a film speed setting is automatically made in an exposure control means, code means indicative of the film speed is provided on a film magazine and is sensed by a film speed sensing means built in a camera.

This kind of camera provided with exposure control means is, on the other hand, disadvantageous in that the type of film usable therein is limited. In other words, these cameras cannot be used with normal conventional film magazines which do not have said code means indicative of the film speed. Therefore, in order to make it possible to use the camera with normal film, it has been suggested that a manual film speed setting means be provided on the camera.

However, the above mentioned camera provided with both automatic and manual film speed setting means suffers from the defect that the structure thereof becomes complicated and the manufacturing cost is raised.

Further, on the other hand, it has been known in the art to provide in a camera body a flash-matic means as defined above. The flash-matic device includes a calculating means which takes into consideration various factors necessary for controlling exposure when a picture is photographed with a flash light means, such as a strobo-flash light or a flash bulb. The calculating means is a mechanical structure employing cams and levers, and accordingly, it is very difficult to combine the flash-matic device with the normal exposure control means which usually employs an electric circuit. Therefore, there have been developed no cameras provided with a combination of a flash-matic device and an exposure control means capable of controlling exposure for various types of film of different film speed.

Under the above circumstances, it is common to provide a manual film speed setting means in cameras which use normal type of films, and to provide an automatic film speed setting means in cameras which use particularly designed films with film speed code means. Since there is only one widely used type of film, that is a negative color film having the film speed of ASA 100, there has been no problem in practice so far with these types of cameras only.

Recently, however, color films of negative type which have film speeds as high as ASA 400 have become commercially available. Thus, it is now desired that cameras should have a combination of an automatic exposure control means and a flashmatic means which is capable of controlling exposure for at least two types of film of different film speed both in daylight and in flash light.

SUMMARY OF THE INVENTION

In view of the above-mentioned need and other circumstances, it is the primary object of the present invention to provide an automatic exposure control device for a photographic camera combined with a flashmatic device which is capable of automatically controlling exposure for two kinds of film speed both in daylight and in flash light and is capable of controlling exposure for other kinds of film speed by use of manual film speed setting means.

It is another object of the present invention to provide an automatic exposure control device for a photographic camera combined with a flash-matic device which is capable of automatically controlling exposure for two kinds of film speed both in daylight and in flash light and which consumes little electric power.

It is still another object of the present invention to provide an automatic exposure control device for a photographic camera combined with a flash-matic device which is capable of automatically controlling exposure for two kinds of film speed both in daylight and in flash light and which is of simple structure and accordingly can be manufactured at low cost.

The above objects of the present invention are accomplished by combining a film speed setting means for a flash-matic device with a film speed setting means for an automatic exposure control device, and by making the film speed setting means associated with a film speed sensing means which distinguishes one film speed from another. One of the two kinds of film speed is indicated on the film magazine which contains the film of said one film speed, while the other film speed is not indicated on the film magazine which contains the film of said other film speed. Further, the present invention is characterized in that the film speed sensing means employs an electromagnet and a mechanical locking means, in which the electromagnet is energized when one film speed is sensed and immediately thereafter a film speed setting means is mechanically locked in the position to reflecting the sensed film speed and the electromagnet is deenergized, thereby reducing the amount of electric power consumed in energizing the electromagnet. The mechanical locking means is operated in response to a normal camera operation such as the closure of the back cover of the camera, shutter charging or film winding. Beside the automatic film speed sensing and setting means, the device in accordance with the present invention is provided with a manual film speed setting means. Once the setting for the film speed is manually made thereby, the exposure is controlled automatically.

DESCRIPTION OF THE PREFERRED EMBODIMENTS

Figure 1:
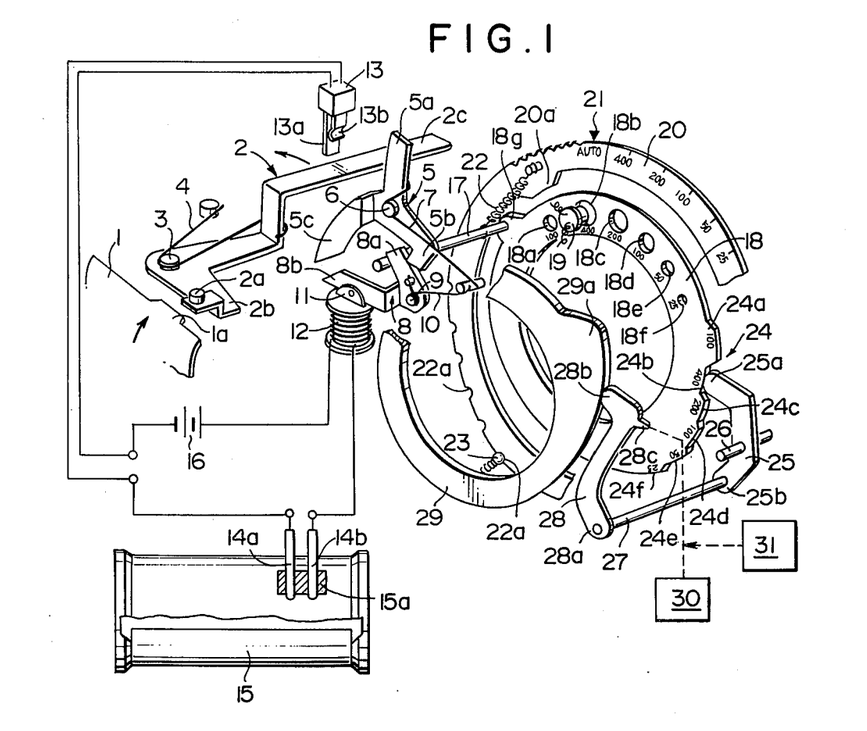
FIG. 1 is a partly broken perspective view which shows an embodiment of the automatic exposure control device in accordance with the present invention.
Figures 2A, 2B, 2C:
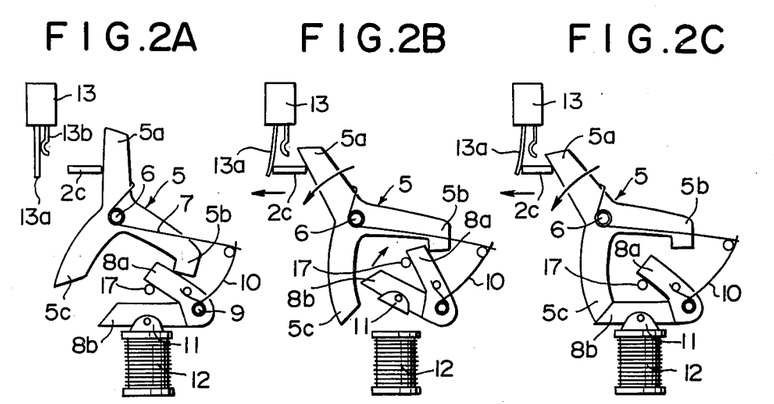
FIGS. 2A to 2C show the movement of a part of the mechanism employed in the embodiment of the invention shown in FIG. 1.

FIG. 1 illustrates an embodiment of the automatic exposure control device in accordance with the present invention in which a film speed setting means is associated with the back cover of a camera body. A back cover 1 is moved in the direction indicated by an arrow when closed. The back cover 1 has a projected portion 1a to push a pin 2a of an operating lever 2 when the back cover 1 is closed. The operating lever 2 is L-shaped when viewed from above and is pivotally mounted on a pivot 3 whereabout it is spring urged in the clockwise direction by means of a spring 4. The L-shaped operating lever 2 is comprised of a short arm 2b and a long arm 2c, said pin 2a being fixed at an end of the short arm 2b. Thus, when the back cover 1 of the camera is closed, the operating lever 2 is rotated counterclockwise as indicated by an arrow overcoming the force of the spring 4. Said long arm 2c is engaged with an arm 5a of a Y-shaped holding lever 5. The Y-shaped holding lever 5 has three arms 5a, 5b and 5c and is rotatably mounted on a pivot 6 being spring urged in the counterclockwise direction by means of a spring 7. The second arm 5b is engaged with an arm 8a of a control lever 8. The control lever 8 is V-shaped when viewed from front and is pivotally mounted on a pivot 9 being spring urged in the clockwise direction by means of a spring 10. The V-shaped control lever 8 is comprised of two arms 8a and 8b. The first arm 8a is in a position to be engageable with said second arm 5b of the holding lever 5, and the second arm 8b of the control lever 8 is in a position to be engageable with the third arm 5c of the holding lever 5. The second arm 8b has an iron piece 11 to be attracted by an electromagnet 12 located therebeneath. The relation between the holding lever 5 and the control lever 8 will be described in more detail with reference to FIGS. 2A to 2C. When the holding lever 5 is rotated clockwise by the long arm 2c of the operating lever 2, the second arm 5b of the holding lever 5 pushes the first arm 8a of the control lever 8 downward to urge the second arm 8b of the control lever 8 onto the electromagnet 12 as shown in FIG. 2A and FIG. 1.

When the cover 1 is closed and the operating lever 2 is rotated counterclockwise, the holding lever 5 is rotated counterclockwise by the force of the spring 7. At this moment, when the electromagnet 12 is not energized, the control lever 8 is also rotated by the force of the spring 10 in the clockwise direction following the counterclockwise rotation of the holding lever 5 as shown in FIG. 2B. If the electromagnet 12 is energized, the iron piece 11 of the second arm 8b of the control lever 8 is attracted by the electromagnet 12 and is retained in its lower position. Then, the third arm 5c of the holding lever 5 holds the second arm 8b of the control lever 8 in said lower position as shown in FIG. 2C.

In the path of the counterclockwise rotation of the long arm 2c of the operating lever 2, there is provided a normally closed switch 13 so that a movable contact 13a thereof will be separated from a fixed contact 13b thereof by the counterclockwise rotation of the long arm 2c. The switch 13 and said electromagnet 12 are connected in series by way of a pair of sensing contacts 14a and 14b which are provided in a film chamber of the camera to sense the particular code means of the film loaded in the film chamber. The code means comprises a conductive member 15a attached on the surface of a film magazine 15 which contains a film of a particular high film speed, e.g. ASA 400, whereas a film magazine which contains a film of normal film speed, e.g. ASA 100 is not provided with the code means 15a. The electromagnet 12, the sensing contacts 14a and 14b, and the switch 13 are connected in series with each other and connected across a power source 16 so that the electromagnet 12 will be energized only when the switch 13 is closed and the sensing contacts 14a and 14b are both in contact with the conductive member 15a. Therefore, when the film magazine which contains a film of normal film speed and accordingly is not provided with a conductive member 15a is loaded in the camera, or when the back cover 1 is closed, the electromagnet 12 is deenergized.

A connecting pin 17 is engaged with the first arm 8a of the control lever 8 so that the connecting pin 17 is moved from first position to second position as the control lever 8 rotates from its upper position to its lower position. Namely, when the control lever 8 is in the position where the first arm 8a thereof is engaged with the second arm 5b of the holding lever 5 which is in its counterclockwise rotated position as shown in FIG. 2B, the connecting pin 17 is in its first position. When the control lever 8 is in the position where the second arm 8b thereof is engaged with the third arm 5c of the holding lever 5 which is in its counterclockwise rotated position as shown in FIG. 2C or when the control lever 8 is in the position where the first arm 8a thereof is engaged with the second arm 5b of the holding lever 5 which is in its clockwise rotated position as shown in FIG. 2A, the connecting pin 17 is its second position. The connecting pin 17 is fixed to a light control ring 18 which carries a series of light control apertures 18a to 18f to be selectively brought into alignment with a photodetector 19 provided in the camera to measure the scene brightness through the light control apertures 18a to 18f. The first aperture 18a is a light control aperture to pass the light therethrough when the film speed of the film loaded in the camera is ASA 100. The second aperture 18b is for ASA 400. These two apertures 18a and 18b are used when the film speed setting for the film loaded in the camera is to be made automatically. As described in detail hereinafter, one of the two apertures 18a and 18b is automatically selected in accordance with the film speed of the film loaded in the camera. The third aperture 18c is for ASA 200, the fourth aperture 18d is for ASA 100, the fifth 18e for ASA 50 and the sixth 18f for ASA 25. The third to sixth apertures 18c to 18f are used when the film speed setting for the film loaded in the camera is made manually. A film speed setting ring 20 is rotatably provided concentrically with the light control ring 18. The film speed setting ring 20 has an inwardly projected portion 20a which is engageable with an outwardly projected portion 18g of the light control ring 18 so that the light control ring 18 is rotated counterclockwise by rotating the film speed setting ring 20 counterclockwise. The film speed setting ring 20 carries indices of "AUTO" and "400", "200" etc. which are selectively brought into alignment with a fixed index 21 provided in the camera. When the index of "AUTO" is aligned with the fixed index 21, the inwardly projected portion 20a is separated from the outwardly projected portion 18g so as to set the light control ring 18 free to bring one of the two apertures 18a and 18b into alignment with the photodetector 19. The film speed setting ring 20 is connected with said connecting pin 17 of the light control ring 18 by means of a tension spring 22 to spring urge the latter clockwise so that the connecting pin 17 may always be in contact with the first arm 8a of the control lever 8. The film speed setting ring 20 is provided on the periphery thereof with notches 22a to be engaged with a click stop ball 23 spring urged toward the notches. When the index of "400" is in alignment with said fixed index 21, the projected portion 20a of the film speed setting ring 20 abuts on the projected portion 18g of the light control ring 18. When the index of "200" or other indices "100" to "25" are brought into alignment with the fixed index 21, the projected portion 20a of the film speed setting ring 20 pushes the projected portion 18g of the light control ring 18 and the corresponding light control apertures 18c or 18d to 18f are brought into alignment with the photodetector 19.

The light control ring 18 further carries a cam portion 24 comprised of film speed indicating cams 24a to 24f which correspond to the light control apertures 18a to 18f, respectively. On the cam portion 24 follows an end 25a of a film speed input lever 25 which is pivotally mounted on a shaft 26. The other end 25b of the film speed input lever 25 is provided with a shaft 27 which is rotatably connected with an end 28a of a distance input lever 28. The other end 28b of the distance input lever 28 follows a cam 29a of a distance control ring 29 which is rotatably provided in a camera body to rotate a focusing lens in the camera to adjust the focusing lens to the distance of the object to be photographed. The distance input lever 28 and the film speed input lever 25 constitute a calculating means for a flash-matic device which controls the aperture size of a diaphragm of the camera in accordance with the film speed of the film loaded in the camera, the distance of the object to be photographed and the guide number of the flash light means attached to the camera to illuminate the object to be photographed. An exposure information indicating projection 28c is provided on the distance input lever 28 and the position of the indicating projection 28c is put into a diaphragm control means 30 to control the aperture size of a diaphragm. A guide member input means 31 is connected with the diaphragm control means 30 to input the flash light guide number information thereinto. In this embodiment, however, a strobo flash light tube is incorporated in the camera body and is not interchangeable. Therefore, the guide number is fixed and accordingly is put into the diaphragm control means 30 in advance. The shutter speed is, of course, fixed to a proper predetermined value when the flash light is used to take pictures.

Apart from the flash-matic device, when the pictures are taken in daylight, the shutter speed or the diaphragm aperture is automatically controlled in accordance with the scene brightness measured by the photodetector 19 by use of a general exposure control circuit. Since there have been known various exposure control means for automatically controlling the shutter speed or the diaphragm aperture in accordance with the scene brightness, a detailed description thereof is not made here.

Now the operation of the above described embodiment of the present invention illustrated in FIGS. 1 and 2A to 2C will be described in detail. When a film magazine 15 which contains a film of particularly high speed, e.g. ASA 400, and accordingly is provided with a conductive member 15a is loaded in a camera, the electromagnet 12 is energized when the back cover 1 of the camera is opened. At this stage, as shown in FIG. 1, the operating lever 2 is in the clockwise rotated position and the holding lever 5 is also in the clockwise rotated position. Therefore, the second arm 5b of the holding lever 5 holds the control lever 8 on the electromagnet 12. Then, as the cover 1 is closed and the long arm 2c of the operating lever 2 moves counterclockwise, the holding lever 5 follows the operating lever 2 and rotates counterclockwise. Since the electromagnet 12 is energized, the iron piece 11 of the second arm 8b of the control lever 8 stays in contact with the top of the electromagnet 12 even after the second arm 5b of the holding lever 5 separates from the first arm 8a of the control lever 8. Thus, the third arm 5c of the holding lever 5 falls into engagement with the second arm 8b of the control lever 8 while the control lever 8 is in its lower position as shown in FIG. 2C. Immediately before the third arm 5c falls into engagement with the second arm 8b of the control lever 8, the long arm 2c of the operating lever 2 reaches a position where it opens the normally closed switch 13. Therefore, when the switch 13 is opened and the electromagnet 12 is deenergized, the second arm 8b of the control lever 8 is already held by the third arm 5c of the holding lever 5. Thus, the electric circuit including the electromagnet is opened when the cover 1 is completely closed, and accordingly, the consumption of the electric power of the power source 16 is small.

Since the control lever 8 is in the position where the second arm 8b is in contact with the electromagnet 12 as shown in FIG. 2C, the connecting pin 17 of the light control ring 18 acts to bring the second aperture 18b of the ring 18 into alignment with the photodetector 19. At the same time, the second cam 24b of the cam portion 24 indicative of the film speed is brought into engagement with the film speed input lever 25 of a flashmatic device. Thus, the film speed information of the film loaded in the camera is put into the flash-matic device as well as an exposure control device including a light measuring photodetector 19.

When a film magazine which contains a film of normal film speed, e.g. ASA 100, and accordingly does not have a conductive member 15a is loaded in a camera, the electromagnet 12 is not energized. Therefore, when the cover 1 of the camera is closed and the operating lever 2 is rotated counterclockwise, the control lever 8 is rotated clockwise as the holding lever 5 rotates counterclockwise as shown in FIG. 2B. This is because the iron piece 11 of the second arm 8b of the control lever 8 is not attracted by the electromagnet 12. Accordingly, the connecting pin 17 is moved to the position where the first control aperture 18a is in alignment with the photodetector 19. Further, the first cam 24a of the cam portion 24 is brought into engagement with the film speed input lever 25 of the flash-matic device. Thus, the film speed is automatically set in the camera with respect to both an automatic exposure control means including a photodetector to measure the scene brightness and a flash-matic means including a calculating means for controlling a diaphragm aperture to take pictures of correct exposure in flash light.

When a film having a film speed different from said two kinds of film speed, i.e. ASA 400 and ASA 100, is loaded in the camera, the film speed setting ring 20 is manually rotated to rotate the light control ring 18 to bring the light control aperture corresponding to the film speed of the film loaded in the camera into alignment with the photodetector 19. Further, the cam portion 24 of the light control ring 18 is moved to the position to input the film speed information into the film speed input lever 25 associated therewith.

The conductive member 15a provided on the film magazine 15 as a film speed indicating means may be a metal plate attached to the surface of the film magazine or may be formed by stripping a part of an insulating coating layer applied on the surface of a metal cylindrical body of the film magazine. Usually, the film magazine is provided with a printed coating on a metal body and the coating layer is electrically insulating. Therefore, by partly stripping the coating layer, a conductive part functioning as the conductive member 15a can be made.

Figure 3:
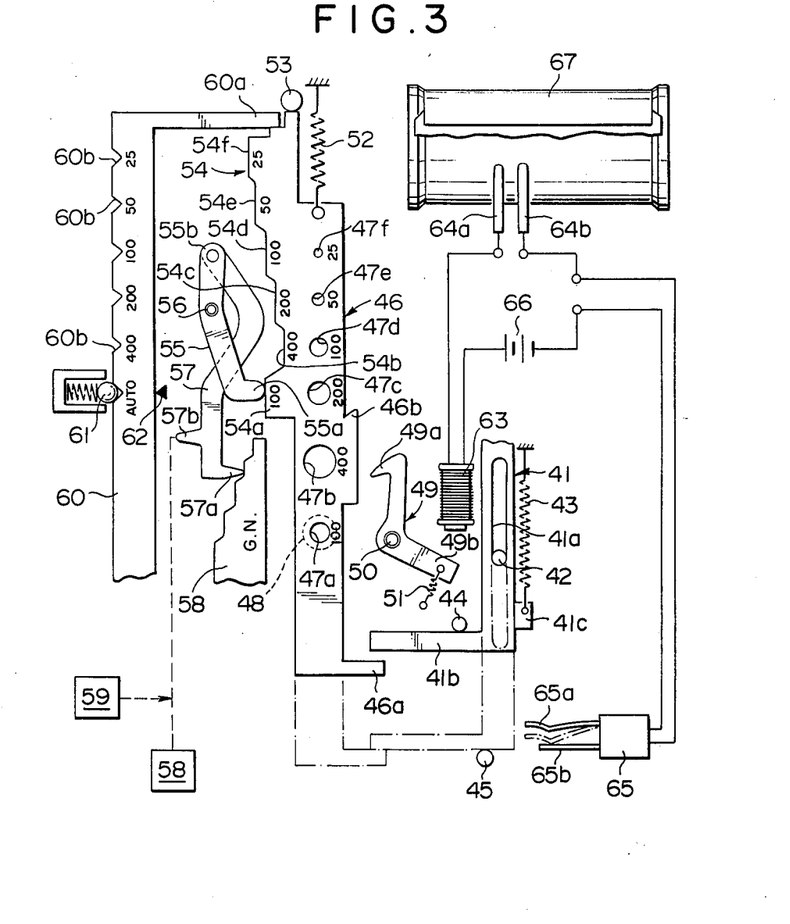
FIG. 3 is a plan view, shown with an electric circuit, of another embodiment of the automatic exposure control device in accordance with the present invention where a standard type of film is loaded in a camera.

A second embodiment of the present invention in which a film speed setting means is automatically operated upon wind-up of a film or upon charging of a shutter mechanism will be described in detail hereinbelow with reference to FIGS. 3 and 4. An L-shaped operating slide member 41 which is moved downward in the drawing when the shutter is charged or the film is wound up is provided in the camera. The operating slide member 41 has a guide slot 41a which is slidably engaged with a guide pin 42 and is spring urged upward by means of a tension spring 43. The operating slide member 41 is thus movable up and down between an upper stopper pin 44 and a lower stopper pin 45. The slide member 41 has an arm 41b extending laterally from the main portion thereof provided with said guide slot 41a. The arm 41b is engageable with an extended portion 46a of a light control member 46.

The light control member 46 corresponds to said light control ring 18 employed in the first embodiment shown in FIG. 1 and is provided with a plurality of light control apertures 47a to 47f. The first aperture 47a is a light control aperture for controlling the amount of light passing therethrough to obtain scene brightness information with reference to the film speed of ASA 100. A photodetector to receive the light passing through the apertures 47a to 47f is indicated by a broken line at 48. The function of the light control apertures 47a to 47f is the same as that of said apertures 18a to 18f described in the first embodiment. The second light control aperture 47b is for ASA 400. The light control member 46 is provided on one side thereof with an engaging projection 46b which is to be engaged with a hook 49a of a locking lever 49. The locking lever 49 is rotatably mounted on a pivot 50 and is spring urged clockwise by means of a spring 51. The locking lever 49 is movable into a position where the hook 49a thereof is engaged with said engaging projection 46b of the light control member 46. The light control member 46 is spring urged upward in the drawing by means of a tension spring 52 and the upward movement thereof is limited by a stopper pin 53.

The light control member 46 is further provided with a cam portion 54 comprised of cams 54a to 54f which correspond to said cams 24a to 24f of the first embodiment, respectively. A film speed input lever 55 pivotally mounted on a pivot 56 has a cam follower end 55a which follows the cam portion 54. The opposite end 55b of the film speed input lever 55 is pivotally connected with one end of a guide member input lever 57 the other end 57a of which follows a cam 58 which represents the guide number of the flash light device used with the camera. The guide number representing cam 58 is manually adjustable to introduce the guide number of the flash light device into the calculating means of the flash-matic device comprising the film speed input lever 55 and a guide number input lever 57. The guide number input lever 57 has an exposure information indicating projection 57b the position of which is put into a diaphragm control means 58. A distance input means 59 is connected with the diaphragm control means 58 to put the information regarding the distance of the object to be photographed into the diaphragm control means 58.

A manually operable film speed setting member 60 which has an arm 60a engaged with one end of the light control member 46 is slidably provided in the camera. The film speed setting member 60 has a plurality of notches 60b to be engaged with a click stop ball 61 so that the film speed setting member 60 is selectively stopped at one of several predetermined positions to bring said light control member 46 to one of several predetermined positions. At each said predetermined position of the light control member 46, one of the light control apertures 47a to 47f is selectively put into alignment with the photodetector 48. When the light control member 46 is in the uppermost position stopped by the stopper pin 53, the arm 60a of the film speed setting member 60 is in contact with the end of the light control member 46 and an index "AUTO" is in alignment with a fixed index 62. By moving the film speed setting member 60 to put the other indices "400", "200", "100+" etc. into alignment with the fixed index 62, the light control member 46 is moved downward so that the second and other light control apertures 47b and 47c to 47f are brought into alignment with the photodetector 48. The operations of these members are quite the same as those of said similar members employed in the first embodiment as shown in FIG. 1, and accordingly a detailed description thereof is omitted here.

Said locking lever 49 has an arm 49b, which is made of metal or other material which is attracted by a magnet. The arm 49b is movable between a position in contact with an electromagnet 63 and a position separated therefrom. The former position is shown in FIG. 4 and the latter is shown FIG. 3. When the arm 49b is in the former position where it is in contact with the electromagnet 63, the hook 49a of the locking lever 49 is in engagement with said engaging projection 46b of the light control member 46 as shown in FIG. 4. When the arm 49b is separated from the electromagnet 63, the hook 49a is separated from the engaging projection 46b.

The electromagnet 63 is connected in series with a pair of contacts 64a and 64b and a normally open switch 65. The pair of contacts 64a and 64b are provided in a film chamber of the camera and serve as a film speed sensing means similarly to said contacts 14a and 14b employed in the first embodiment shown in FIG. 1. The normally open switch 65 is located at a position where the switch 65 is closed by the downward movement of said operating slide member 41. In more detail, the operating slide member 41 has a projection 41c which is brought into abutment with a movable contact 65a of the switch 65 to push the same into contact with a fixed contact 65b of the switch 65 to close the same when the slide member 41 is moved downward to near the lower limit of movement thereof. Therefore, when the slide member 41 is moved downward, the electromagnet 63 is not energized until the slide member 41 comes nearly to its lower limit, at which time the switch 65 is closed and the electromagnet 63 is energized if, of course, there is an electric conductive member between the pair of contacts 64a and 64b. The circuit including the contacts 64a and 64b, the normally open switch 65 and the electromagnet 63 also includes a power source 66.

Now the operation of the above described embodiment of the present invention will be described in detail with reference to FIGS. 3 and 4. When a film of normal film speed, i.e. ASA 100, contained in a normal film magazine 67 which does not have a conductive means is loaded in the camera as shown in FIG. 3, the electromagnet 63 is not energized because there is no conductive material between the pair of contacts 64a and 64b. Therefore, the locking lever 49 is in the position separated from the electromagnet 63 and from the engaging projection 46b of the light control member 46 as shown in FIG. 3. Accordingly, when the operating slide member 41 is moved downward and then upward in response to or in association with a shutter charging operation or a film wind-up operation, the light control member 46 is moved downward and then upward following the movement of the operating slide member 41. Thus, finally the light control member 46 is stopped in the uppermost position stopped by the stopper pin 53 as shown in FIG. 3. Therefore, the first light control aperture 47a is put into alignment with the photodetector 48. Further, the first cam 54a of the cam portion 54 for introducing the film speed information into a flash-matic device is in contact with the film speed input lever 55 of a calculating means of the flash-matic device.

Figure 4:
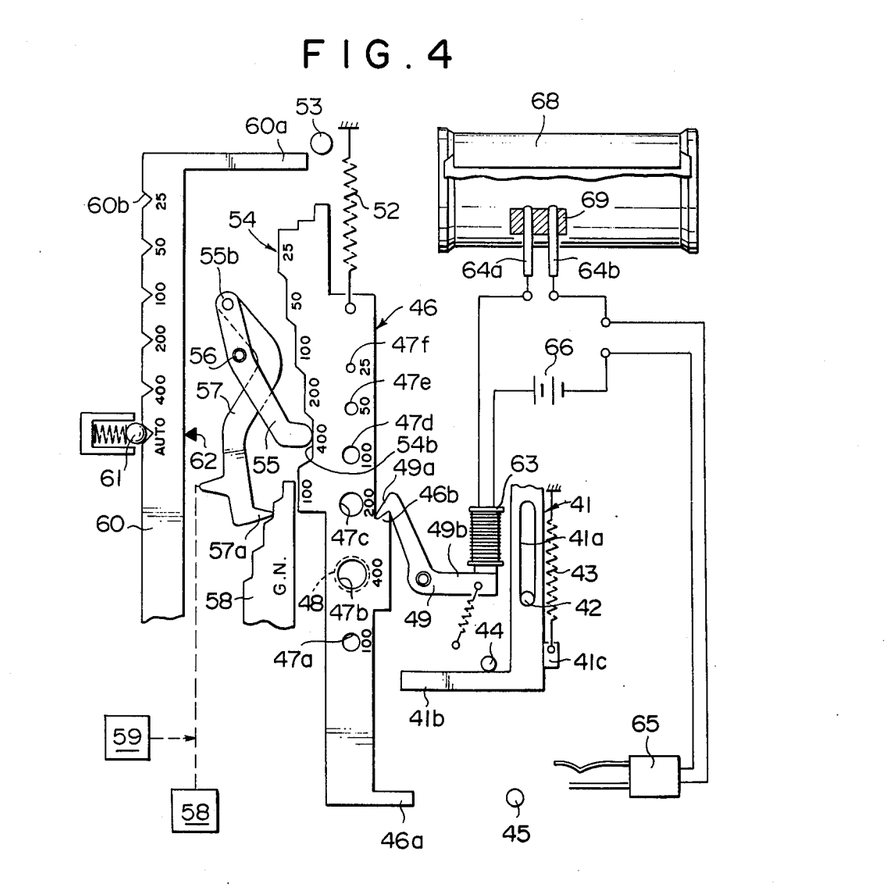
FIG. 4 is a view similar to FIG. 3 where a special type of film is loaded in a camera.

When a film of special film speed, i.e. ASA 400, contained in a film magazine 68 which is provided with a conductive member 69 is loaded in the camera as shown in FIG. 4, the electromagnet 63 is energized when the normally open switch 65 is closed by the downward movement of the operating slide member 41. By the magnetic force of the electromagnet 63, the arm 49b of the locking lever 49 is attracted by the electromagnet 63 and the locking lever 49 is rotated counterclockwise. Accordingly, the hook 49a of the locking lever 49 is moved to the position where the engaging projection 46b of the light control member 46 is engageable with the hook 49a. Therefore, even after the operating slide member 41 is moved upward causing the switch 65 to open, the light control member 46 remains in the lower position with the engaging projection 46b thereof engaged with the hook 49a of the locking lever 49. Since the light control member 46 is in the lower position, the second light control aperture 47b for ASA 400 is put into alignment with the photodetector 48. Further, the film speed input lever 55 is in contact with the second cam 54b of the cam portion 54. Thus, the film speed of the film of the special film speed, i.e. ASA 400, is put into the flash-matic device as well as the automatic exposure control device. The detailed explanation of the flash-matic device and the automatic exposure control device are omitted here since these have been explained in detail in the foregoing embodiment of the invention with reference to FIG. 1. Since the light control member 46 is held in the position as shown in FIG. 4 by the mechanical engagement of the hook 49a and the engaging projection 46b once the operating slide member 41 is moved upward, there is no consumption of electric power while the light control member 46 is held in its lower position as shown in FIG. 4.

Figure 5:
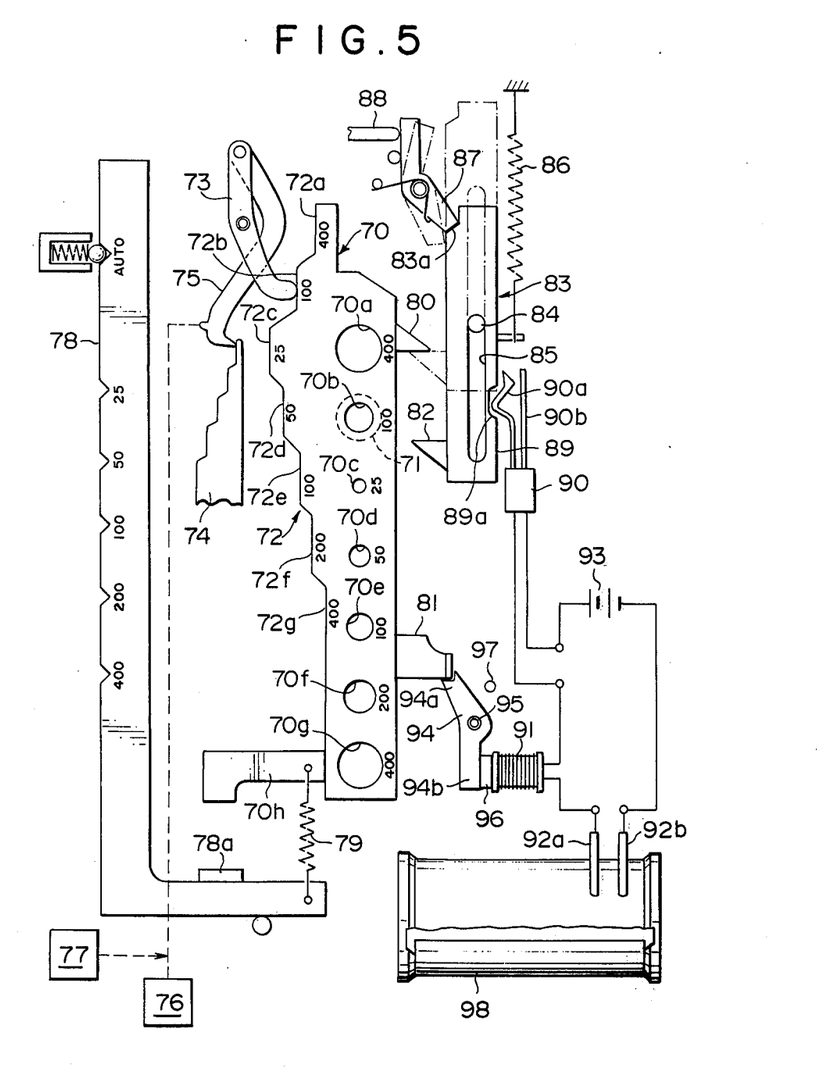
FIG. 5 is a plan view, shown with an electric circuit, of still another embodiment of the automatic exposure control device in accordance with the present invention where a standard type of film is loaded in a camera.
Figure 6:
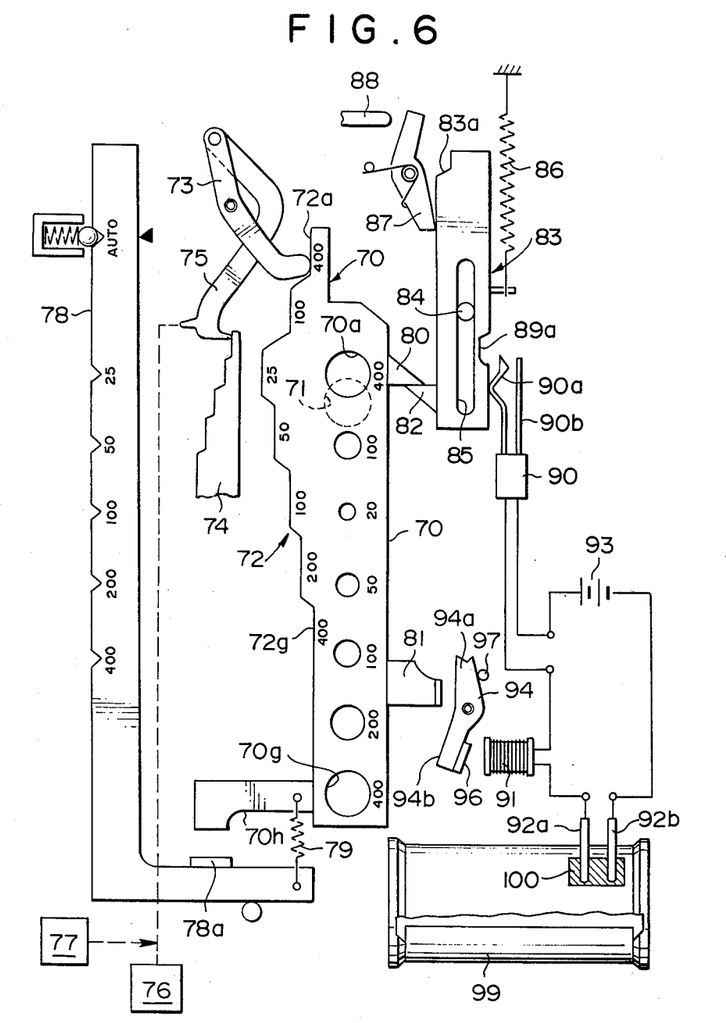
FIG. 6 is a view similar to FIG. 5 where a special type of film is loaded in a camera and a mechanism for sensing the film speed of the special type of film is in the process of moving from a normal position to a sensed position.
Figure 7:
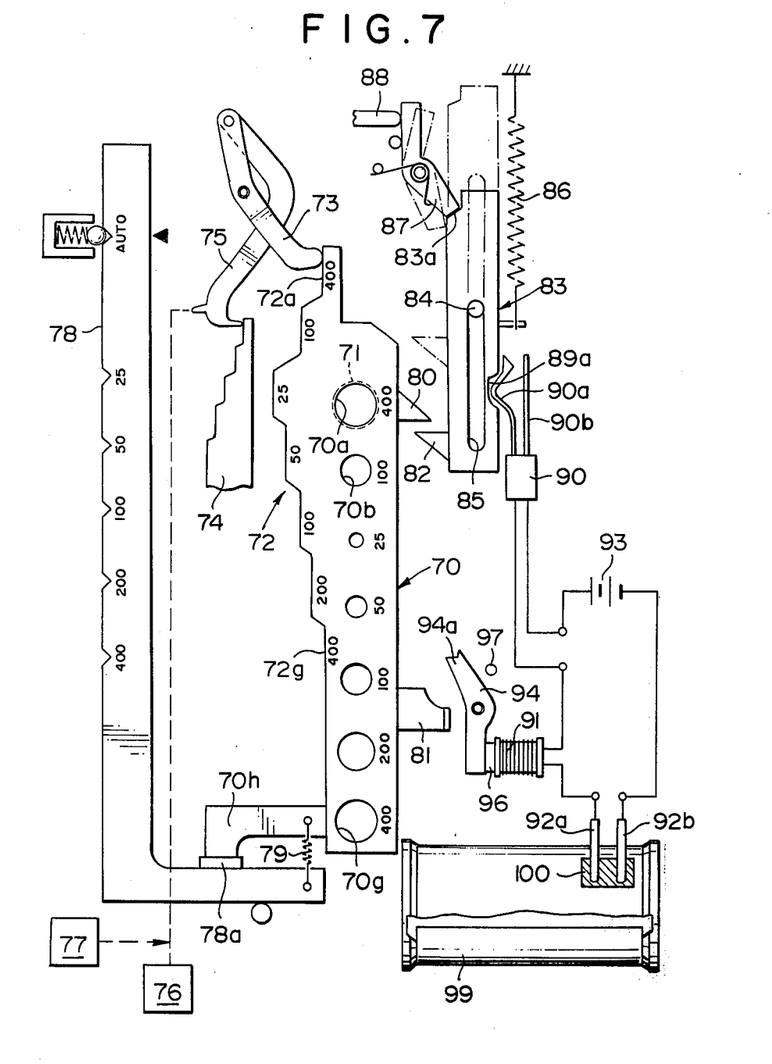
FIG. 7 is a view similar to FIGS. 5 and 6 where said mechanism for sensing the film speed of the special type of film is in the sensed position to control the exposure based on the special film speed.

A third embodiment of the device in accordance with the present invention which employs a shutter charging or a film wind-up mechanism for operating a film speed setting means is illustrated in FIGS. 5 to 7 and will be described in detail hereinbelow with reference to the drawing.

A light control member 70 carrying a series of light control apertures 70a to 70g, a photodetector 71 provided for receiving light passing through one of the apertures 70a to 70g, a cam portion 72 formed on said light control member 70 comprised of cams 72a to 72g which correspond to said apertures 70a to 70g, a film speed input lever 73 following said cam portion 72, a guide number indicating cam 74, a guide number input lever 75 following the guide number indicating cam 74, a diaphragm control means 76, a distance information input means 77 connected with the diaphragm control means 76, and a film speed setting member 78 for manually setting said light control member 70 are all equivalent to those employed in the former embodiments and the function thereof will be readily understood by those skilled in the art without detailed description thereof. Therefore, the detailed description of the structure and operation of the above elements is omitted here. Only those features of these elements which are different from those of the elements employed in the former embodiments will simply be described. The light control member 70 carries two apertures 70a and 70g for the same film speed, i.e. ASA 400, wherein one aperture 70a is used for automatic film speed setting and the other aperture 70g is used for manual film speed setting. The light control member 70 and the film speed setting member 78 are combined with each other by means of a tension spring 79 so that the light control member 70 is spring urged downward in the drawing. Further, the light control member 70 has an arm 70h on which a projected portion 78a of the film speed setting member 78 abuts when the latter is moved upward in the drawing, so that the light control member 70 is moved upward by manually moving the film speed setting member 78 upward.

The light control member 70 has two projections 80 and 81. The former projection 80 is engageable with a projection 82 of a shutter charging member 83 which is slidably guided by means of a pin 84 provided fixedly in the camera and a slot 85 formed therein. The shutter charging member 83 is spring urged upward by means of a tension spring 86 and is moved downward in response to the operation to charge a shutter release mechanism (not shown). When the shutter charging member 83 is moved down to the lower limit of movement thereof, the upper portion 83a is engaged with a stopper lever 87 to be prevented from returning upward. When the shutter is released, the stopper lever 87 is disengaged from the upper portion 83a of the shutter charging member 83 by means of a shutter release pin 88 to allow the shutter charging member to return upward. One side 89 of the shutter charging member 83 is provided with a recess 89a. In the vicinity of said side 89 of the shutter charging member 83 is located a normally open switch 90 having a movable contact 90a and a fixed contact 90b so that the movable contact 90a is put into contact with the fixed contact 90b when the shutter charging member 83 is moved downward. In more detail, when the shutter charging member 83 is in the upper position indicated with a chain line before the shutter is charged, the movable contact 90a of the normally open switch 90 is separated from the fixed contact 90b thereof. Then, when the shutter charging member 83 is moved down to charge the shutter mechanism, said side 89 of the shutter charging member 83 pushes the movable contact 90a of the switch 90 into contact with the fixed contact 90b to close the switch 90. When the shutter charging member 83 is further moved downward, said recess 89a of the side 89 of the shutter charging member 83 comes to the movable contact 90a to allow the same to separate from the fixed contact 90b to open the switch 90.

The normally open switch 90 is connected in series with an electromagnet 91 and a pair of sensing contacts 92a and 92b. The switch 90, the electromagnet 91 and the pair of contacts 92a and 92b are connected across a power source 93 to form a film speed sensing circuit. The pair of contacts 92a and 92b are equivalent to the contacts 14a and 14b, and 64a and 64b employed in the former embodiments hereinbefore described.

The latter projection 81 of said light control member 70 is engageable with an engaging end 94a of a control lever 94 which is rotatably mounted on a pivot 95. The control lever 94 has an arm 94b which has a permanent magnet 96 fixed thereto. The permanent magnet 96 is mounted on the arm 94b in such a position that the permanent magnet 96 is movable between a position to be in contact with the electromagnet 91 and a position separated therefrom as the control lever 94 rotates about said pivot 95. There is a stopper pin 97 to limit the clockwise rotation of the control lever 94. The counterclockwise rotation of the control lever 94 is limited by the abutment of the permanent magnet 96 on the electromagnet 91. The electromagnet 91 is so designed that there may be created a repulsive force between the permanent magnet 96 and the electromagnet 91 when the electromagnet 91 is energized. When the electromagnet 91 is not energized, the permanent magnet 96 attracts the electromagnet 91 and accordingly the arm 94b moves toward the electromagnet and the permanent magnet 96 is put into contact with the electromagnet 91 as shown in FIGS. 5 and 7. When the electromagnet 91 is energized, the permanent magnet 96 is moved away from the electromagnet 91 by the repulsive force created therebetween as shown in FIG. 6. When the arm 94b is moved to the position where the permanent magnet 96 is in contact with the electromagnet 91, the engaging end 94a of the control lever 94 is in the position to be engaged with said projection 81 of the light control member 70 as shown in FIG. 5. When the permanent magnet 96 is separated from the electromagnet 91, the engaging end 94a of the control lever 94 is in the position away from the projection 81 of the light control member 70 as shown in FIG. 6.

Now the operation of the third embodiment described hereinabove will be described in detail with reference to FIGS. 5 to 7. When a film magazine 98 containing a film of normal film speed, i.e. ASA 100, and accordingly having no film speed indicating code is loaded in a camera, the pair of contacts 92a and 92b are not short-circuited and the electromagnet 91 is, therefore, not energized. Accordingly, the permanent magnet 96 is in contact with the electromagnet 91 as shown in FIG. 5 even when the switch 90 is closed by the downward movement of the shutter charging member 83. Therefore, in the course of the downward movement of the light control member 70 accompanying the downward movement of the shutter charging member 83, the projection 81 of the light control member 70 is engaged with the engaging end 94a of the control lever 94. Since the light control member 70 is spring urged downward by the tension spring 79, the light control member 70 is retained in the position where the projection 81 is engaged with the engaging end 94a of the control lever 94. In this position, the second light control aperture 70b is in alignment with the photodetector 71. The film speed input lever 73 of the flash-matic means is engaged with the second cam 72b indicative of the normal film speed, i.e. ASA 100.

When a film magazine 99 containing a film of specially high speed, i.e. ASA 400, and accordingly having a conductor 100 attached on the surface thereof as shown in FIG. 6 is loaded in a camera, the pair of contacts 92a and 92b are short-circuited. Therefore, when the shutter charging member 83 is moved downward to charge a shutter mechanism and the normally open switch 90 is closed, the electromagnet 91 is energized to move the permanent magnet 96 away therefrom. Thus, the control lever 94 is in the clockwise rotated position limited by the stopper pin 97 as shown in FIG. 6. Since the engaging end 94a of the control lever 94 is away from the projection 81 of the light control member 70 in this position, the light control member 70 is allowed to move downward accompanying the downward movement of the shutter charging member 83. After the projection 81 has passed by the engaging end 94a of the control lever 94, the recess 89a of the shutter charging member 83 comes to the movable contact 90a of the switch 90 to allow the movable contact 90a to separate from the fixed contact 90b of the switch 90 to open the switch 90. Therefore, the electromagnet 91 is deenergized and the permanent magnet 96 comes into contact with the electromagnet 91 as shown in FIG. 7. The light control member 70 is thus moved down to the lower limit of movement where the arm 70h of the light control member 70 is stopped by the projection 78h of the film speed setting member 78 and the first light control aperture 70a is in alignment with the photodetector 71. Simultaneously, the film speed input lever 73 for the flash-matic device is engaged with the first cam 72a of the cam portion 72 indicative of the film speed of ASA 400.

Thus, the exposure control means provided in the camera is supplied with an output of the photodetector 71 taking into consideration the specially high film speed of the film loaded in the film magazine 99. Further, the flash-matic device in the camera is also supplied with information on the specially high film speed through the film speed input lever 73.

At the first stage of the upward movement of the shutter charging member 83, the shutter is released with the information put into the exposure control means or the flash-matic device. Then, by the further upward movement of the shutter charging member 83 the light control member 70 is moved upward to its original upper position where the second aperture 70b is in alignment with the photodetector 71. On the way of the upward movement of the light control member 70, the projection 81 passes by the engaging end 94a of the control lever slightly rotating the same clockwise overcoming the magnetic force effected between the permanent magnet 96 and the electromagnet 91.

I claim:

1. An automatic exposure control device for a camera provided with an automatic exposure control means including a photodetector to measure scene brightness and an exposure factor control means which controls an exposure factor such as shutter speed or diaphragm aperture in accordance with the scene brightness measured by said photodetector with reference to the film speed of a film loaded in the camera and further provided with a flash-matic means including a calculating means which gives an output to control the size of a diaphragm aperture taking into account such factors as the film speed of the film loaded in the camera, the distance of the object to be photographed and the guide number of flash light means used for illuminating the object to be photographed, said camera being adapted to be used with at least two kinds of film magazines, one being loaded with a film of special film speed and being provided with a conductor on an external surface thereof and the other being loaded with a film of normal film speed and not being provided with a conductor, wherein the improvement comprises:
    a first switching means which is closed by said conductor on the film magazine loaded with a film of the special film speed,
    a second switching means connected in series with the first switching means and opened in response to opening movement of a back cover of the camera,
    an electromagnet connected with a power source in series with said first and second switching means so as to be energized when both the switching means are closed, and
    a film speed setting means which is connected with said flash-matic means to give thereto a factor of film speed, and carries at least two light control apertures of different sizes selectively brought into alignment with said photodetector,
    said film speed setting means being put into a state to set said special film speed in the flash-matic means when said electromagnet is energized.

2. An automatic exposure control device for a camera provided with an automatic exposure control means including a photodetector to measure scene brightness and an exposure factor control means which controls an exposure factor such as shutter speed or diaphragm aperture in accordance with the scene brightness measured by said photodetector with reference to the film speed of a film loaded in the camera and further provided with a flash-matic means including a calculating means which gives an output to control the size of a diaphragm aperture taking into account such factors as the film speed of the film loaded in the camera, the distance of the object to be photographed and the guide number of flash light means used for illuminating the object to be photographed, said camera being adapted to be used with at least two kinds of film magazines, one being loaded with a film of special film speed and being provided with a conductor on an external surface thereof and the other being loaded with a film of normal film speed and not being provided with a conductor, wherein the improvement comprises:
    a film speed sensing means composed of a pair of electric contacts which are short-circuited by said conductor on the film magazine loaded with a film of the special film speed,
    an electromagnet connected in series with said electric contacts so as to be energized when the contacts are short-circuited,
    a light control member which carries at least two light control apertures of different size, a first light control aperture to be aligned with the photodetector of said automatic exposure control means when a film of normal film speed is loaded in the camera and a second light control aperture to be aligned with the photodetector when a film of special film speed is loaded in the camera, said light control member being movable between at least two positions, a first position and a second position, in said first position said first light control aperture being aligned with said photodetector and in said second position said second aperture being aligned with the photodetector,
    a control member pivotally mounted on a fixed pivot and movable between a first position where said control member is engageable with a part of said light control member to hold the same in said first position and a second position where said control member is not engageable with a part of said light control member to allow the same to be in said second position, said control member being movable from said second position to said first position thereof by said electromagnet upon energization thereof,
    an operating member provided in the camera for moving said light control member first from said second position to said first position and then from said first position to said second position, and
    means for mechanically locking said control member in said first position to hold said light control member in said first position,
    means for moving said mechanically locking means into a position to lock said control member upon operation of an operating member in a camera, and
    an electric switch means connected in series with said electric contacts and said electromagnet to energize the electromagnet only when the switch means is closed and said contacts are short-circuited, said electric switch means being operatively connected with said means for moving said mechanically locking means so that the switch means is closed on the way of the movement of said means for moving the mechanically locking means and is opened at the final stage of the movement thereof.

3. An automatic exposure control device as defined in claim 2 wherein said means for moving said mechanically locking means is operatively connected with a back cover of the camera which is opened and closed when a film in the camera is changed, said means for moving said mechanically locking means being moved in the direction to open said electric switch when the cover is opened and in the direction to close said electric switch when the cover is closed.

4. An automatic exposure control device as defined in claim 3 wherein said means for moving said mechanically locking means is a lever pivotally mounted on a fixed shaft in the camera, said lever having two arms one of which is engageable with a part of the back cover of the camera and the other of which is engageable with said means for mechanically locking said control member and said electric switch means, so that said lever moves said mechanically locking means into a position to lock said control member and opens said electric switch means when the back cover of the camera is opened, and said lever moves said mechanically locking means into a position to release said control member and closes said switch means when the back cover is closed.

5. An automatic exposure control device as defined in claim 4 wherein said mechanically locking means is a lever having three arms, a first arm thereof being engageable with an arm of said lever for moving the same upon operation of the back cover of the camera, a second arm thereof being engageable with a part of said control member to hold the control member in its first position, a third arm thereof being engageable with another part of said control member to hold the control member in its first position, wherein said control member is movable from its first position to second position when the electromagnet is not energized while said locking means is moved from a position where said second arm is engaged with said part of the control member to a position where said third arm is engaged with said another part of the control member.

6. An automatic exposure control device as defined in claim 4 wherein said electric switch means is a normally closed switch and said lever for moving the locking means is spring urged in a direction to be separated from the switch to close the same, said lever being moved in the direction opposite to said urged direction by means of said back cover of the camera.

7. An automatic exposure control device for a camera provided with an automatic exposure control means including a photodector to measure scene brightness and an exposure factor control means which controls an exposure factor such as shutter speed or diaphragm aperture in accordance with the scene brightness measured by said photodetector with reference to the film speed of a film loaded in the camera and further provided with a flash-matic means including a calculating means which gives an output to control the size of a diaphragm aperture taking into account such factors as the film speed of the film loaded in the camera, the distance of the object to be photographed and the guide number of flash light means used for illuminating the object to be photographed, said camera being adapted to be used with at least two kinds of film magazines, one being loaded with a film of special film speed and being provided with a conductor on an external surface thereof and the other being loaded with a film of normal film speed and not being provided with a conductor, wherein the improvement comprises:

a film speed sensing means composed of a pair of electric contacts which are short-circuited by said conductor on the film magazine loaded with a film of the special film speed, an electromagnet connected in series with said electric contacts so as to be energized when the contacts are short-circuited, a light control member which carries at least two light control apertures of different size, a first light control aperture to be aligned with the photodetector of said automatic exposure control means when a film of normal film speed is loaded in the camera and a second light control aperture to be aligned with the photodetector when a film of special film speed is loaded in the camera, said light control member being movable between at least two positions, a first position and a second position, in said first position said first light control aperture being aligned with said photodetector and in said second position said second aperture being aligned with the photodetector, a control member pivotally mounted on a fixed pivot and movable between a first position where said control member is engageable with a part of said light control member to hold the same in said first position and a second position where said control member is not engageable with a part of said light control member to allow the same to be in said second position, said control member being movable from said second position to said first position thereof by said electromagnet upon energization thereof, an operating member provided in the camera for moving said light control member first from said second position to said first position and then from said first position to said second position, and an electric switch means connected in series with said electric contacts and said electromagnet to energize the electromagnet only when the switch means is closed and said contact are short-circuited, said electric switch means being operatively connected with said operating member so as to be closed thereby when said operating member is moved to a position where said light control member is moved from said second position to said first position and opened thereby when said operating member is moved to a position where said light control member is moved from said first position to said second position.

8. An automatic exposure control device as defined in claim 7 wherein said light control member is provided with an engaging portion to be engaged with said control member, said engaging portion being engaged with said control member when the control member is in said first position and said light control member is in said first position.

9. An automatic exposure control device as defined in claim 8 wherein said light control member is spring urged in the direction from said first position to said second position and said control member is engaged with said engaging portion of the light control member to prevent the movement of the light control member from the first position to the second position, so that the light control member is moved from the first position to the second position when the control member is in its second position.

10. An automatic exposure control device as defined in claim 9 wherein said operating member is engaged with a part of said light control member to move the same from said second position to said first position overcoming the spring urge and is disengageable from said part of the light control member when said light control member is engaged with said control member.

11. An automatic exposure control device as defined in claim 10 wherein said light control member is provided with a projected portion and said operating member has an extended portion engaged with one side of said projected portion so that the light control member is moved only in one direction by said extended portion overcoming the spring urge working thereon and the operating member is freely moved in the direction opposite to said direction leaving said light control position when the light control member is engaged with said control member.

12. An automatic exposure control device as defined in claim 7 wherein said operating member is operatively connected with a shutter control mechanism, whereby the operating member is moved to move said light control member in response to the shutter control operation.

13. An automatic exposure control device as defined in claim 7 wherein said operating member is operatively connected with a film wind up mechanism, whereby the operating member is moved to move said light control member in response to the film wind up operation.

14. An automatic exposure control device as defined in claim 7 wherein said electric switch means is a normally opened switch and is closed by a part of said operating member.

15. An automatic exposure control device for a camera provided with an automatic exposure control means including a photodetector to measure scene brightness and an exposure factor control means which controls an exposure factor such as shutter speed or diaphragm aperture in accordance with the scene brightness measured by said photodetector with reference to the film speed of a film loaded in the camera and further provided with a flash-matic means including a calculating means which gives an output to control the size of a diaphragm aperture taking into account such factors as the film speed of the film loaded in the camera, the distance of the object to be photographed and the guide number of flash light means used for illuminating the object to be photographed, said camera being adapted to be used with at least two kinds of film magazines, one being loaded with a film of special film speed and being provided with a conductor on an external surface thereof and the other being loaded with a film of normal film speed and not being provided with a conductor, wherein the improvement comprises:
  a film speed sensing means composed of a pair of electric contacts which are short-circuited by said conductor on the film magazine loaded with a film of the special film speed,
  an electromagnet connected in series with said electric contacts so as to be energized when the contacts are short-circuited,
  a light control member which carries at least two light control apertures of different size, a first light control aperture to be aligned with the photodetector of said automatic exposure control means when a film of normal film speed is loaded in the camera and a second light control aperture to be aligned with the photodetector when a film of special film speed is loaded in the camera, said light control member being movable between at least two positions, a first position and a second position, in said first position said first light control aperture being aligned with said photodetector and in said second position said second aperture being aligned with the photodetector,
  a control member pivotally mounted on a fixed pivot and movable between a first position where said control member is engageable a part of said light control member to hold the same in said second position and a second position where said control member is not engageable with a part of said light control member to allow the same to be in said first position, said control member being movable from said first position to said second position by said electromagnet upon energization thereof,
  an operating member provided in the camera for moving said light control member from said second position to said first position, and
  an electric switch means connected in series with said electric contacts and said electromagnet to energize the electromagnet only when the switch means is closed and said contacts are short-circuited, said electric switch means being operatively connected with said operating member so as to be closed thereby when said operating member is on the way of movement from a position where said light control member is in said second position to a position where said light control member is in said first position and opened thereby when said operating member is in a position to locate said light control member in said second position or a position to locate said light control member in said first position.

16. An automatic exposure control device as defined in claim 15 wherein said control member is provided with a permanent magnet fixed thereto which is magnetically attracted by said electromagnet when the electromagnet is nor energized and makes a repulsive magnetic force between the permanent magnet and said electromagnet when the electromagnet is energized.

17. An automatic exposure control device as defined in claim 15 wherein said light control member is spring urged from said second position to said first position and said operating member is engaged with said light control member to prevent the movement thereof from said second position to said first position.

18. An automatic exposure control device as defined in claim 17 wherein said operating member is moved from a position to hold said light control member in said second position to a position to allow the movement of said light control member from said second position to said first position.

19. An automatic exposure control device as defined in claim 18 wherein said operating member is provided with a locking means which locks the operating member in the position where the same allows the movement of said light control member from said second position to said first position.

20. An automatic exposure control device as defined in claim 19 wherein said locking means is moved to release said operating member upon release of a shutter in the camera.

21. An automatic exposure control device as defined in claim 18 wherein said operating member is moved in response to a shutter control operation.

22. An automatic exposure control device as defined in claim 18 wherein said operating member is moved in response to a film wind up operation.

23. An automatic exposure control device as defined in claim 15 wherein said electric switch means is a normally opened switch and is closed by a part of said operating member when the operating member is moved from one position to another.

24. An automatic exposure control device as defined in claim 23 wherein said operating member is a slidable member slidable from one position to another and is provided on one side end thereof with a recess to receive a contact of said switch means to open the same when the contact of the switch means is aligned with the recess, said switch means being closed by said side end of the slidable member when the slidable member is moved from one position where said side end is not engaged with the switch means to another position where said recess is aligned with said switch means.

* * * * *